(12) United States Patent
Vanderhoff et al.

(10) Patent No.: US 8,638,198 B2
(45) Date of Patent: Jan. 28, 2014

(54) UNIVERSAL REMOTE CONTROL SYSTEMS, METHODS, AND APPARATUSES

(75) Inventors: Earl W. Vanderhoff, Cranston, RI (US); Frank A. McKiel, Jr., Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 472 days.

(21) Appl. No.: 12/956,924

(22) Filed: Nov. 30, 2010

(65) Prior Publication Data

US 2012/0133841 A1    May 31, 2012

(51) Int. Cl.
*G05B 11/01* (2006.01)
(52) U.S. Cl.
USPC .............. 340/12.28; 340/12.22; 340/12.15; 341/176
(58) Field of Classification Search
USPC .................................... 340/12.28; 725/45
See application file for complete search history.

(56) References Cited

U.S. PATENT DOCUMENTS

| | | | |
|---|---|---|---|
| 2003/0080874 A1* | 5/2003 | Yumoto et al. | 340/825.71 |
| 2004/0070491 A1* | 4/2004 | Huang et al. | 340/10.5 |
| 2004/0189591 A1* | 9/2004 | Breuil | 345/156 |
| 2007/0050054 A1* | 3/2007 | Sambandam Guruparan et al. | 700/65 |

* cited by examiner

*Primary Examiner* — Daniel Wu
*Assistant Examiner* — Frederick Ott

(57) ABSTRACT

An exemplary method includes a universal remote control device detecting user input requesting that the universal remote control device be operated in a learning mode, initiating, in response to the user input, operation of the universal remote control device in the learning mode, receiving, during the operation of the universal remote control device in the learning mode, a device code via an inter-device communication, and automatically configuring, in response to the receiving of the device code via the inter-device communication, the universal remote control device for remotely controlling a target device associated with the device code. Corresponding systems, methods, and apparatuses are also disclosed.

24 Claims, 8 Drawing Sheets

UNIVERSAL REMOTE CONTROL SYSTEMS, METHODS, AND APPARATUSES

BACKGROUND INFORMATION

Audio/video "AV" entertainment devices and infrared remote control devices for remotely controlling the AV devices have become commonplace in modern society. Because manufacturers usually provide dedicated remote control devices together with AV devices, a typical modern household has multiple dedicated remote control devices each configured to control a particular AV device. For example, a home entertainment system may include a television, an AV receiver/repeater, a sound system device, set-top box ("STB") device, a Digital Video Disc ("DVD") and/or a Blu-ray disc player, and a Digital Video Recorder ("DVR"), each of which may have a separate dedicated remote control device. Consequently, a user of the home entertainment system typically has to keep track of and use several individual, dedicated remote control devices to control the various components of the home entertainment system.

To help alleviate a user's burden of keeping track of and using several individual, dedicated remote control devices to control various AV devices, universal remote controls have been introduced. A conventional universal remote control device allows a user to control multiple individual AV devices with a single hand-held remote control device. In order for the universal remote control device to correctly control various AV devices, the user first programs the universal remote control device to control the specific makes and models of the AV devices. This is typically done by the user manually looking up and entering a device code for a particular AV device into the universal remote control device. This process may be repeated by the user for each AV device to be controlled by the universal remote control device.

Unfortunately, such manual programming of a universal remote control device may be inconvenient and/or burdensome to a user, especially if the user does not have access to or is unable to easily locate a device code for a particular AV device. In addition, the manual process must be repeated each time an AV device is added or replaced.

Certain traditional universal remote control devices provide a "code search" feature, which may be useful when a user does not know or have access to a device code for a particular AV device. When a "code search" feature is invoked by a user of a universal remote control device, the universal remote control device cycles through a list of device codes maintained by the device. Simultaneously, in order to cause the universal remote control device to output a test command for each device code in the list, the user must manually and repeatedly press a button on the universal remote control device until the user observes that the AV device for which the universal remote control device is being programmed to control responds to the button press. The user must then provide additional manual input to the universal remote control device to indicate that the appropriate device code has been found.

Such trial-and-error-based programming of a universal remote control device may also be inconvenient and/or burdensome to a user. For example, if the device code being searched for is near the end of the code list maintained by the universal remote control device, the user may be required to press the button numerous times (e.g., over a hundred times) before the correct device code is found, or before the user determines that the correct device code is not included in the code list.

Another problem with conventional universal remote control devices is that the physical buttons on the devices are fixed in appearance and/or dedicated to certain functions. Consequently, a conventional universal remote control device may not be capable of being programmed to perform all functions of an AV device. For example, if a conventional universal remote control device does not include a button dedicated to a "fast forward" function, then the universal remote control device may not be programmed to output a "fast forward" command for any AV device. As a result, a user may be forced to rely on a separate, dedicated remote control device to direct an AV device to perform the "fast forward" function because the function cannot be programmed into the universal remote control device.

To avoid such a problem, conventional universal remote control devices typically include a large number of fixed, dedicated physical buttons (e.g., more than eighty buttons). The result is a universal remote control device with a fixed button palette that is crowded and complex, and that includes buttons that are rarely or never utilized by a user. Such a button palette decreases the ease of use and increases the learning curve for the universal remote control device.

For at least these reasons, there is a need for new and/or improved universal remote control systems, methods, and apparatuses.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 1 illustrates an exemplary universal remote control system according to principles described herein.

FIGS. 2A-2C illustrate exemplary implementations of the system of FIG. 1 according to principles described herein.

FIGS. 3A-3B illustrate additional exemplary implementations of the system of FIG. 1 according to principles described herein.

FIG. 4 illustrates an exemplary method of programming a universal remote control device according to principles described herein.

FIGS. 5A-5B show exemplary default button palettes displayed on a universal remote control device according to principles described herein.

FIG. 6 illustrates an exemplary custom skin displayed together with a default button palette on a universal remote control device according to principles described herein.

FIG. 7 illustrates an exemplary device selector palette displayed on a universal remote control device according to principles described herein.

FIG. 8 illustrates an exemplary computing device according to principles described herein.

DETAILED DESCRIPTION OF PREFERRED EMBODIMENTS

Exemplary universal remote control systems, methods, and apparatuses are described herein. As described in more detail herein, an exemplary universal remote control device may be configured to detect user input requesting that the universal remote control device be operated in a learning mode, initiate, in response to the user input, operation of the universal remote control device in the learning mode, receive, during the operation of the universal remote control device in the learning mode, a device code via an inter-device communication, and automatically program, in response to the receiving of the device code via the inter-device communication, the universal remote control device for remotely controlling a target electronic device associated with the device code.

In this or a similar manner, the universal remote control device, when operating in a learning mode, may receive a device code via an inter-device communication from a device external to the universal remote control device and use the device code to automatically program the universal remote control device for use by a user to remotely control a target electronic device (e.g., customer premises equipment "CPE" such as a television, AV receiver/repeater, sound system device, STB device, DVD player, Blu-ray disc player, DVR, etc.) associated with the device code. The process may be performed for any appropriately configured target device and may be repeated to program the universal remote control device for use by the user to remotely control multiple different target devices. Accordingly, the universal remote control device may be automatically programmed to remotely control one or more target devices without the user having to manually enter a device code into the universal remote control device or repeatedly press a button on the universal remote control device in a trial-and-error search for the correct device code.

Hence, the exemplary universal remote control systems, methods, and apparatuses described herein may reduce, simplify, and/or eliminate manual input required of a user (e.g., an end user) to program a universal remote control device. Additionally or alternatively, exemplary universal remote control systems, methods, and apparatuses described herein may provide configurable displays on a universal remote control device, which may expand the usefulness, intuitiveness, flexibility, and/or programmability of the universal remote control device.

As used herein, the term "device code" may refer to any data descriptive of or otherwise associated with a target electronic device. For example, a device code may include, without limitation, data representative of a traditional numerical index (e.g., a numerical control code) associated with the target device and that may be used to identify and/or access configuration data that may be used to automatically program a universal remote control device, data representative of configuration data that may be used to automatically program a universal remote control device, data representative of a type of target device (e.g., whether the target device is a DVR, STB, or television type device), and/or any other data representative of information descriptive or of otherwise associated with the target device.

Figure 1:
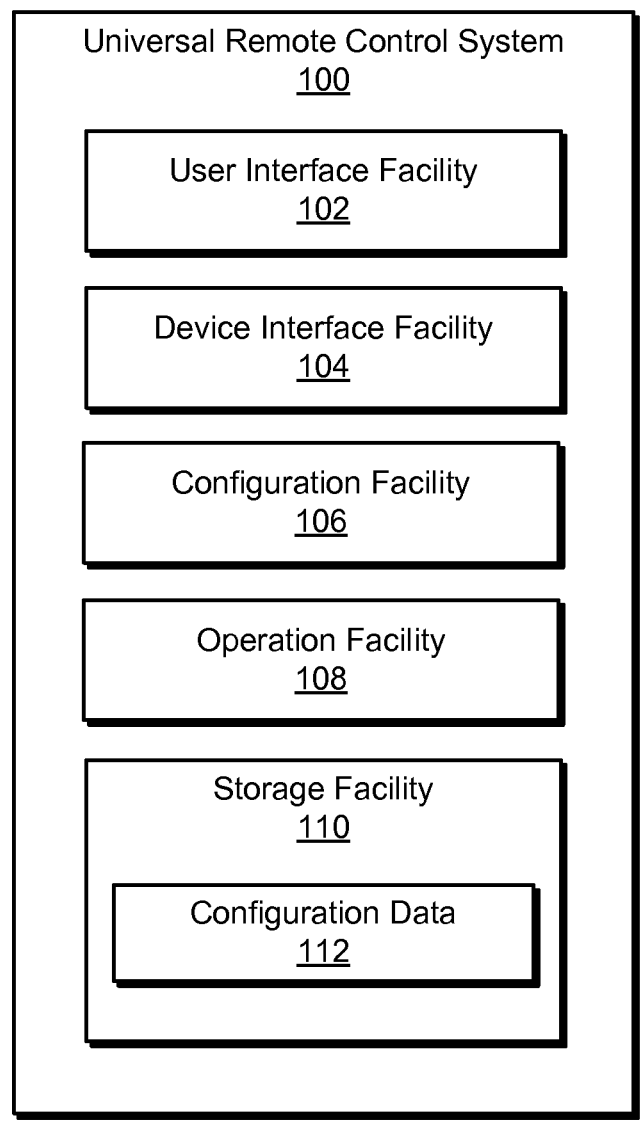

FIG. 1 illustrates an exemplary universal remote control system 100 (or simply "system 100"). As shown, system 100 may include a user interface facility 102, a device interface facility 104, a configuration facility 106, an operation facility 108, and a storage facility 110, which may be in communication with one another using any suitable communication technologies.

User interface facility 102 may be configured to provide a user with capability for interacting with system 100. Through user interface facility 102, the user may provide user input to a universal remote control device and/or a separate electronic device (e.g., CPE) targeted for remote control by the universal remote control device. To this end, user interface facility 102 may employ any technologies suitable for receiving input provided by an end user of a universal remote control device and/or a target device. For example, user interface facility 102 may include one or more physical buttons on a universal remote control device and/or a target device that may be actuated by the user. Additionally or alternatively, user interface facility 102 may include one or more displays configured to display graphical elements (e.g., text and/or graphics such as buttons, skins, and/or other graphical elements) for viewing and/or interaction by the user. For instance, user interface facility 102 may include a configurable display such as a touch screen display, a liquid crystal display ("LCD"), an electrophoretic display such as a bi-stable e-paper or e-ink display, or any other display on a universal remote control device through which graphical elements may be displayed and user input may be received.

Through user interface facility 102, a user may provide user input related to configuring and/or operating a universal remote control device to control one or more target devices. As described below, for example, the user may provide user input requesting that the universal remote control device be operated in a learning mode during which the universal remote control device may be programmed for remotely controlling one or more target devices. In addition, while the universal remote control device is operating in a control mode, during which the universal remote control device is configured to transmit commands to a target device to control operation of the target device, the user may provide user input directing the operation of the universal remote control device (e.g., by selecting the commands to be transmitted to the target device). Examples of user interface components of exemplary universal remote control devices are described in more detail below.

Device interface facility 104 may be configured to transmit and/or receive inter-device communications. For example, through device interface facility 104, a universal remote control device may transmit and/or receive communications to/from one or more electronic devices (e.g., CPE, a server device, a computer, etc.) that are external to the universal remote control device. As described in detail below, through device interface facility 104, the universal remote control device may receive a device code via an inter-device communication from an external device. The inter-device communication carrying the device code may be transmitted by any appropriately configured device external to the universal remote control device, including, without limitation, a CPE device (e.g., a target device), a server device, and/or a computer. The inter-device communication may be in infrared, radio frequency, Bluetooth, Ethernet, TCP/IP, and/or any other suitable format. Examples of inter-device communications between a universal remote control device and one or more other electronic devices external to the universal remote control device are described below.

Configuration facility 106 may be configured to program a universal remote control device for controlling one or more target devices. For example, in response to user interface facility 102 receiving user input requesting operation in a learning mode, configuration facility 106 may initiate operation of the universal remote control device in learning mode. During operation in learning mode, configuration facility 106 is prepared to program the universal remote control device for remotely controlling one or more target devices. For example, in response to device interface facility 104 receiving a device code via an inter-device communication from an external device during operation in learning mode, configuration facility 106 may automatically program the universal remote control device with a configuration for controlling a particular target device (e.g., a CPE device) associated with the device code. The programming of the universal remote control device may be performed in any suitable way, including any of the ways described herein. In addition to automatic programming of the universal remote control device as described herein, configuration facility 106 may be configured to support manual or other conventional ways of programming of the universal remote control device such that a user may program the universal remote control device to remotely control legacy target devices that are not equipped to support automatic programming of the universal remote control device.

Operation facility 108 may be configured to operate a universal remote control device in a control mode during which the universal remote control device may be configured to detect user input, map the input to one or more commands, and transmit the one or more commands to a target device to control operation of the target device. The one or more commands may be received, interpreted, and used by the target device to trigger one or more operations of the target device.

Configuration facility 106 and operation facility 108 may be configured to program and operate a universal remote control device in accordance with multiple configurations for controlling multiple respective target devices. For example, configuration facility 106 may program the universal remote control device with multiple configurations for remotely controlling multiple target devices. During operation of the universal remote control device in control mode, operation facility 108 may set one of the configurations to be active so that the universal remote control device is configured to output commands to control a particular target device corresponding to the active configuration. For example, the universal remote control device may be programmed to include a first configuration for controlling a television and a second configuration for controlling a DVD player. During operation of the universal remote control device in control mode, a user of the universal remote control device may provide input indicating which configuration is to be active (e.g., the user may select a target device selector button that has been assigned during programming of the universal remote control device to be associated with the configuration). The universal remote control device may receive the user input and activate the selected configuration. With the selected configuration active, the user may actuate one or more buttons of the universal remote control device to cause the universal remote control device to transmit one or more commands associated with the active configuration to the corresponding target device. Additionally or alternatively, during operation in control mode, the user may provide input indicating that another configuration is to be activated. In response, control facility 108 may activate the other configuration to allow the user to utilize the universal remote control device to control a different target device that corresponds to the other configuration.

Storage facility 110 may be configured to maintain configuration data 112 that may be used by configuration facility 106 to program a universal remote control device and/or that is representative of one or more programmed configurations of the universal remote control device. Storage facility 110 may maintain additional or alternative data as may serve a particular implementation.

Figure 2A:
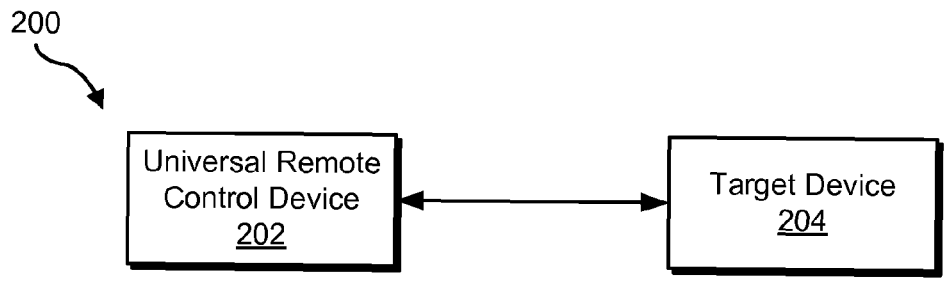
Figure 2B:
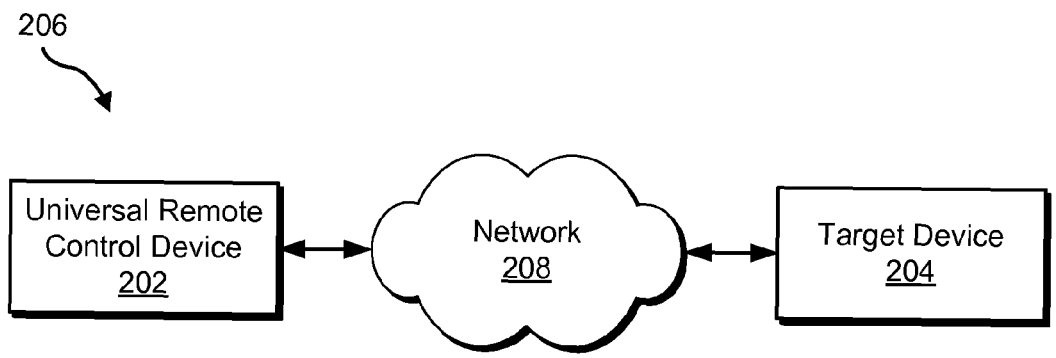
Figure 2C:
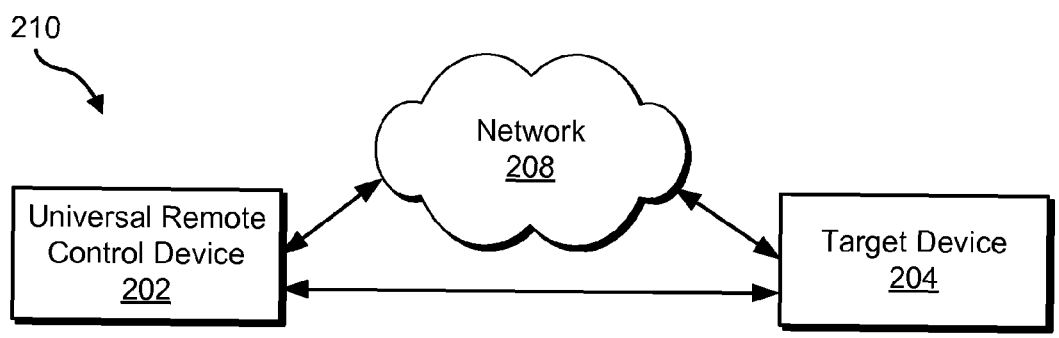

FIGS. 2A-2C illustrate exemplary implementations of system 100. Implementation 200 shown in FIG. 2A includes a universal remote control device 202 and a target device 204 configured to communicate directly one with another. Implementation 206 shown in FIG. 2B includes universal remote control device 202 and target device 204 configured to communicate by way of a network 208. Implementation 210 shown in FIG. 2C includes universal remote control device 202 and target device 204 configured to communicate directly and by way of network 208. Implementation 210 may be a hybrid version of implementations 200 and 206 and may provide for certain communications between universal remote control device 202 and target device 204 to be direct communications and other communications between universal remote control device 202 and target device 204 to be by way of network 208.

Direct communications between universal remote control device 202 and target device 204 may include infrared signals, radio frequency signals, Bluetooth connection signals, other wireless signals, signals transmitted over a direct wired connection between universal remote control device 202 and target device 204, and/or any other suitable direct communications between universal remote control device 202 and target device 204. Communications between universal remote control device 202 and target device 204 by way of network 208 may include any suitable network-carried communications such as TCP, IP, TCP/IP, Wi-Fi, Ethernet, etc. connections. Network 208 may include one or more networks or types of networks (and communication links thereto) capable of carrying signals between universal remote control device 202 and target device 204. For example, network 208 may include, but is not limited to, one or more local area networks (e.g., a home Wi-Fi and/or Ethernet network).

Universal remote control device 202 may include any user-operable device implementing one or more facilities 102-110 of system 100 such that universal remote control device 202 may be programmed to remotely control one or more target electronic devices such as target device 204). In certain embodiments, universal remote control device 202 may be programmed, as described herein, to transmit commands (e.g., IR codes) to target device 204 to trigger one or more operations by target device 204.

Target device 204 may include any device that may be remotely controlled by universal remote control device 202. Target device 204 may implement one or more facilities 102-110 or functions of system 100 such that target device 204 is configured to support automatic programming of universal remote control device 202 to control target device 204. For example, target device 204 may be configured to transmit an inter-device communication carrying a device code associated with target device 204 to universal remote control device 202 for use by universal remote control device 202 to automatically program universal remote control device 202 for remotely controlling target device 204. In some embodiments, target device 204 may transmit only the device code to universal remote control device 202. In other embodiments, target device 204 may also be configured to transmit configuration data (e.g., data representative of a set of commands, a button palette, a mapping between buttons and commands, a set of graphical elements, etc.) to universal remote control device 202 for use by universal remote control device 202 to automatically program universal remote control device 202 for remotely controlling target device 204. The device code and/or configuration data may be received by universal remote control device 202 directly from target device 204 and/or by way of network 208, as described herein. Examples of target device 204 include, without limitation, a CPE device such as a television, AV receiver/repeater, sound system device, STB device, DVD player, Blu-ray disc player, DVR, and media player device.

Figure 3A:
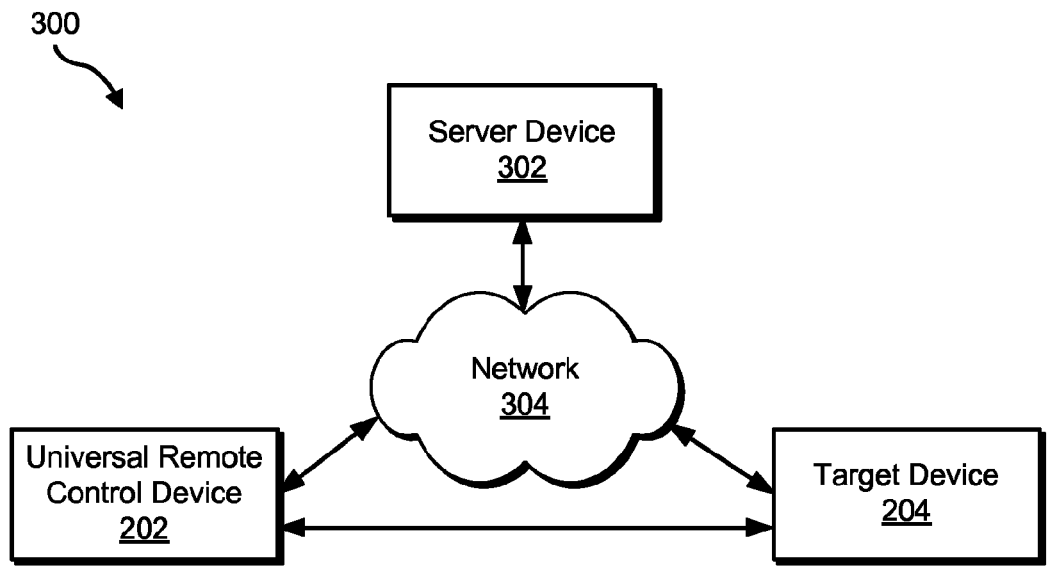
Figure 3B:
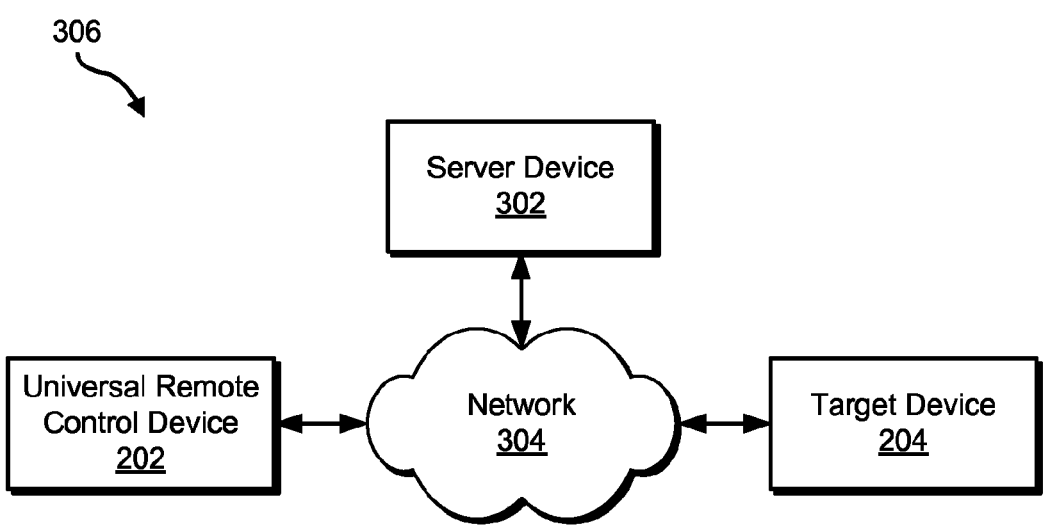

FIGS. 3A-3B illustrate additional exemplary implementations of system 100. Implementation 300 shown in FIG. 3A includes a universal remote control device 202 and a target device 204 configured to communicate directly one with another and a server device 302 configured to communicate with either or both of universal remote control device 202 and target device 204 by way of a network 304. Implementation 306 shown in FIG. 3B includes universal remote control device 202, target device 204, and service device 302 configured to communicate with one another by way of network 304. In implementations 300 and 306, communications between universal remote control device 202 and target device 204 may be as described above for implementations 200 and 206, respectively. In addition, at least one of universal remote control device 202 and target device 204 may be configured to communicate with server device 302 by way of network 304 using any suitable network-based communication technologies (e.g., TCP, IP, TCP/IP, Wi-Fi, Ethernet, FTP, HTTP, HTTPS, SIP, SOAP, XML and variations thereof, Simple Mail Transfer Protocol ("SMTP"), RTP, UDP, etc. types of communications).

In addition or alternative to the examples of networks and types of networks that may be included in network 208, network 304 may include one or more additional or alternative networks or types of networks to support communications with server device 302, including, without limitation, wireless data networks (e.g., a mobile data network), subscriber television networks (e.g., broadcast, multicast, and/or narrowcast television networks), satellite networks, cable networks, hybrid fiber coax networks, broadband networks, the Internet, wide area networks, and any other networks capable of carrying data and/or communications signals between server device 302 and either or both universal remote control device 202 and target device 204.

Accordingly, server device 302 may be configured to communicate with universal remote control device 202 and/or target device 204 to facilitate automatic configuration of universal remote control device 202 to control target device 204. For example, in response to receipt of a device code from target device 204 and a data location identifier (e.g., a file path), universal remote control device 202 may be configured to access configuration data associated with the device code from server device 302 and utilize the configuration data to program universal remote control device 202 for remotely controlling target device 204.

Figure 4:
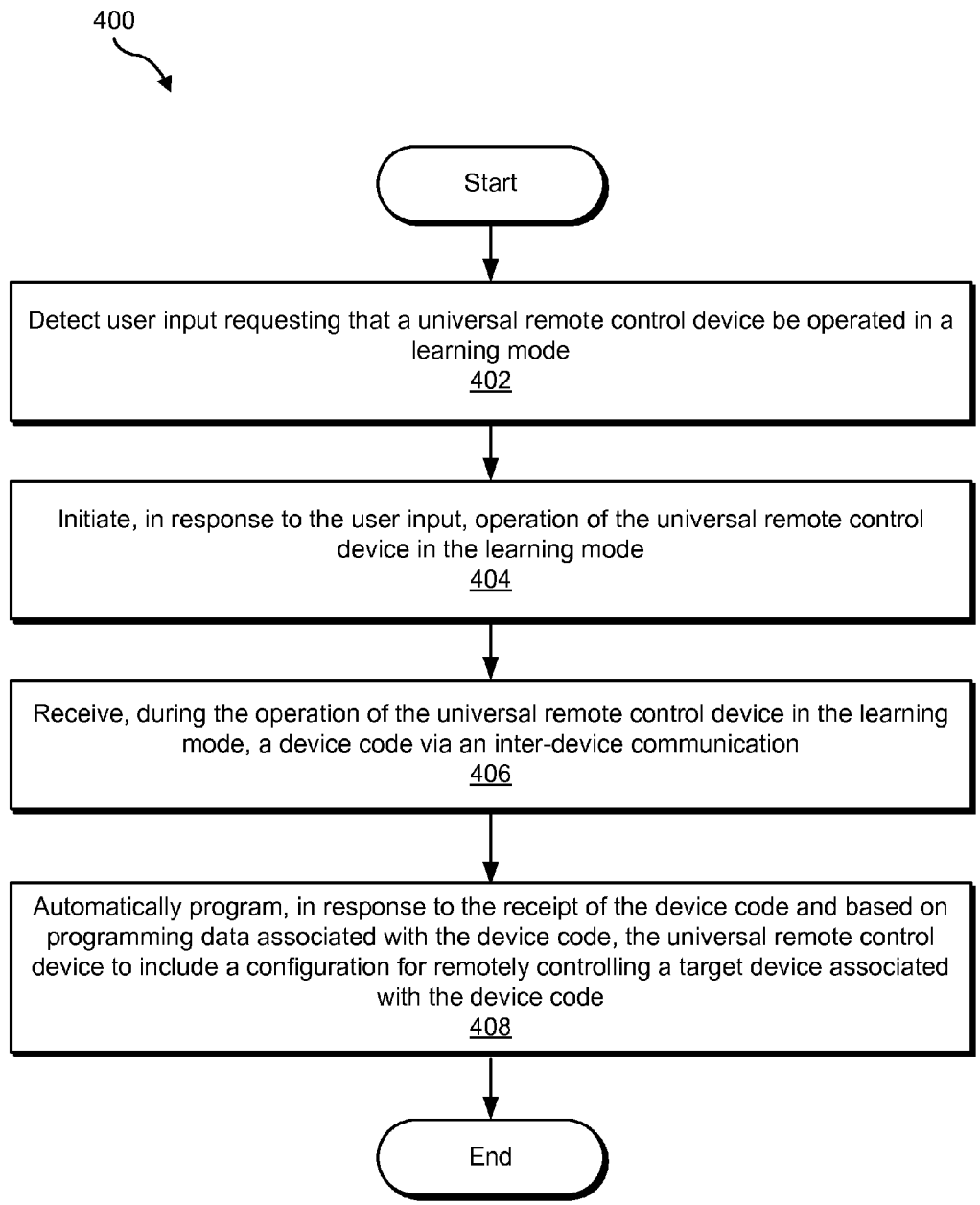

FIG. 4 illustrates an exemplary method 400 of programming a universal remote control device such as universal remote control device 202. While FIG. 4 illustrates exemplary steps according to one embodiment, other embodiments may omit, add to, reorder, combine, and/or modify any of the steps shown in FIG. 4. The steps shown in FIG. 4 may be performed by any component or combination of components of system 100, universal remote control device 202, target device 204, and/or server device 302.

In step 402, user input requesting that a universal remote control device be operated in a learning mode may be detected. For example, universal remote control device 202 may detect user input requesting that universal remote control device 202 be operated in a learning mode. The user input may be provided by a user in any suitable way, including by actuating a dedicated physical button of universal remote control device 202 (e.g., a hidden or semi-hidden switch of universal remote control device 202), a sequence of buttons, or performing some other action on universal remote control device 202 that is not easy to inadvertently perform.

In step 404, operation of the universal remote control device in the learning mode may be initiated in response to the user input detected in step 402. For example, universal remote control device 202 may initiate operation of universal remote control device 202 in learning mode. While operating in learning mode, universal remote control device 202 may be automatically programmed to remotely control a target device.

In step 406, during the operation of the universal remote control device in the learning mode, a device code may be received by the universal remote control device via an inter-device communication. For example, universal remote control device 202 operating in learning mode may receive the device code via an inter-device communication. The inter-device communication may include a communication transmitted by a device external to universal remote control device 202 and received by universal remote control device 202 from the external device. The inter-device communication may be in any format suitable for inter-device communication with universal remote control device 202. The inter-device communication may include a direct communication between the external device and universal remote control device 202 or an indirect communication that passes through a network and/or one or more intermediate devices.

For example, a target device such as target device 204 may transmit the inter-device communication carrying the device code, and universal remote control device 202 may receive the inter-device communication carrying the device code from target device 204. The inter-device communication carrying the device code may include a direct communication from target device 204 to universal remote control device 202, as may occur in implementation 200 of FIG. 2A, implementation 210 of FIG. 2C, or implementation 300 of FIG. 3A. For instance, target device 204 may transmit an infrared signal, radio frequently signal, Bluetooth connection signal, or some other wireless signal, which may be received by universal remote control device 202 directly from target device 204. Alternatively, the inter-device communication carrying the device code may include a communication from target device 204 to universal remote control device 202 by way of a network (e.g., network 208 or 304), as may occur in implementation 206 of FIG. 2B, implementation 210 of FIG. 2C, implementation 300 of FIG. 3A, or implementation 306 of FIG. 3B. For instance, target device 204 may transmit a network signal (e.g., an Ethernet, Wi-Fi, or other network signal), and one or more network devices (e.g., a local area network router) may receive and route the signal to universal remote control device 202.

Target device 204 may be configured to transmit the inter-device communication carrying the device code associated with target device 204 in response to a detected occurrence of any suitable predetermined event. For example, target device 204 may be configured to transmit the device code in response to target device 204 powering on, powering off, or receiving predetermined user input (e.g., a user selection of a menu option or actuation of a dedicated physical button of target device 204).

To illustrate, while universal remote control device 202 is operating in learning mode, a user may provide user input to target device 204 to trigger transmission of the device code associated with target device 204. For example, the user may actuate a "power on" button of target device 204 or actuate a dedicated "device code transmission" button or menu option of target device 204. Target device 204 may respond by transmitting an inter-device communication carrying the device code associated with target device 204 to universal remote control device 202. Compared to the manual user input required by conventional programming of traditional universal remote control devices, the providing of simple user input to target device 204 (e.g., pressing a "power on" or other button of target device 204) is relatively more simple, straightforward, intuitive, and/or convenient for an end user.

Other ways of triggering transmission of a device code by target device 204 may be employed in other embodiments. For example, when operating in learning mode, universal remote control device 202 may be configured to transmit one or more requests for device codes by pinging, polling, or otherwise transmitting requests that may be received by any target devices within range of universal remote control device 202. Universal remote control device 202 may transmit such a request directly or indirectly to a target device, including in any of the ways described herein (e.g., by infrared signaling, radio frequency signaling, network-based communications, etc). In such implementations, a target device such as target device 204 may receive a device code request from universal remote control device 202 and respond by transmitting an inter-device communication carrying the device code associated with target device 204 to universal remote control device 202, without requiring any user input.

Universal remote control device 202 and target device 204 may be configured to transmit and/or receive any communications suitable for requesting, transmitting, and/or receiving a device code. As an example, in certain implementations, universal remote control device 202 may be configured to transmit a device code request when operating in learn mode. Any target device within range may receive the request and transmit a response. Universal remote control device 202 may listen for responses to the request. When a response is detected, universal remote control device 202 may handshake with the target device that sent the response to instruct the target device to proceed to transmit its device code. Where infrared, radio frequency, or other wireless communications are used, the target device may be configured to respond to the request using a first frequency and to transmit the device code using a second frequency after handshaking in order to ensure that device codes are transmitted in turn using the second frequency so as to not interfere with one another. Target device responses to the request on the first frequency may be intermittent, staggered, and/or repeated so as to minimize interference. This polling example is illustrative only. Other protocols for transmitting and receiving device codes may be implemented in other embodiments.

In response to the receipt of the device code in step 406, in step 408, the universal remote control device may be automatically programmed for remotely controlling a target device associated with the device code. For example, in response to the receipt of the device code associated with target device 204, universal remote control device 202 may automatically program universal remote control device 202 for remotely controlling target device 204.

The automatic programming may include any operation(s) for programming the universal remote control device to function to control operation of the target device, including functions and enable the universal remote control device to receive user inputs, map the user inputs to one or more commands configured to control operation of the target device, and transmit the one or more commands to the target device. To this end, for example, using the received device code, the universal remote control device may access, store, mark, and/or activate configuration data representative of a configuration associated with the device code and use the configuration data to program the universal remote control device to function in accordance with the configuration to control operation of the target device.

The universal remote control device may be configured to access the configuration data from any suitable source, including from at least one of a data store internal to the universal remote control device (e.g., from within a library of configuration settings maintained by the universal remote control device), a target device (e.g., the target device associated with the device code), and a server device (e.g., server device 302). As an example, the universal remote control device may utilize the received device code to query a library of configuration settings maintained by the universal remote control device to identify a configuration associated with the device code. The universal remote control device may then mark, activate, or otherwise process the configuration to program the universal remote control device to function to control the target device associated with the device code. As another example, the universal remote control device may utilize the received device code to request configuration data associated with the device code from one or more external sources, such as a server device and/or the target device. As another example, the universal remote control device may receive the configuration data associated with the device code from the target device and/or a server device together with the device code. For instance, the target device may transmit configuration data together with the device code to the universal remote control device. In other examples, the configuration data may be received from a combination of sources. For example, a subset of data representative of a configuration associated with the device code may be accessed from one source (e.g., from memory internal to the universal remote control device) and another subset of data representative of the configuration may be access from another source (e.g., from a server device).

In certain examples, the programming of the universal remote control device may include assigning a configuration associated with a device code to a particular user input, such as a device or configuration selector button. For example, the universal remote control device may assign a first configuration for controlling a first target device (e.g., a television) to a first device selector button (e.g., a "TV" button) and a second configuration for controlling a second target device (e.g., a DVD player) to a second device selector button (e.g., a "DVD" button). Accordingly, when the universal remote control device is operating in control mode, the universal remote control device may detect a user actuation of a particular device selector button and respond by activating the configuration that has been assigned to the device selector button during programming of the universal remote control device. Hence, a user of the universal remote control device may cause the universal remote control device to toggle through configurations to select which target device to control with the universal remote control device.

A configuration may include any data for configuring the universal remote control device to function to control a target device. For example, a configuration may specify one or more user inputs (e.g., one or more buttons of a button palette), one or more commands, and a mapping of the user inputs to the commands. Accordingly, when the configuration is active and a user input is received, the universal remote control device may use data representative of the configuration to map the user input to one or more commands, which may then be transmitted by the universal remote control device to the target device.

In addition to including data for configuring a universal remote control device to function to control a target device, in certain examples, a configuration may include data for configuring the universal remote control device to present a display that is specific to the target device. To this end, a configuration may include data representative of one or more graphical elements, including data representative of text and/or graphics (e.g., button text, button graphics, skin graphics, etc.) that may be displayed on a configurable display of the universal remote control device. The universal remote control device may access data representative of custom graphical elements from any of the sources and/or in any of the ways described herein. The data representative of custom graphical elements may be in any suitable format such as one or more jpeg or bitmap images.

An automatic programming of a universal remote control device may include programming the universal remote control device to display one or more graphical elements, such as a button palette specific to a configuration when the configuration is active. Accordingly, the universal remote control device may be configured to toggle between different custom displays in conjunction with toggling between configurations associated with respective target devices.

In certain implementations, a universal remote control device may employ a bi-stable e-paper technology to provide a configurable display that may be changed to display a particular button palette at a given time. The use of a bi-stable e-paper technology may allow the universal remote control device to conserve energy by not consuming battery power to simply maintain the same appearance of the display. In addition, certain e-paper technologies may be implemented to provide a display on a flexible material or surface. As a result, separate pieces of e-paper may be individually implemented on button surfaces or as a single sheet covering an entire surface of the universal remote control device. For example, a film of e-paper may be placed atop physical buttons (e.g., tactile blister switches). As another example, a film of e-paper may be mounted beneath a clear touch-screen surface.

In certain embodiments, a film of e-paper may be implemented atop a grid of sensor nodes (e.g., pressure sensor nodes) that may be individually activated or deactivated as part of the programming of the universal remote control device. The programming may include activating certain sensor nodes to align with graphical elements depicted on the film of e-paper. Accordingly, the buttons depicted on the e-paper display become active for detecting user selection of the buttons. The e-paper may be modified to display button text and/or graphics for the buttons.

In certain embodiments, the layout of physical sensor buttons beneath the film of e-paper may be fixed. In such embodiments, the text and/or graphics associated with the buttons may be dynamically changed while the layout remains fixed. In other embodiments, the layout of physical sensor buttons may be configurable, such as by selectively activating and deactivating sensor nodes to align active sensors to various layouts of buttons.

After the universal remote control device has been programmed and is operating in control mode, a user of the universal remote control device may provide user input indicating a desired target device to control. In response, the universal remote control device may activate a configuration associated with the target device, and a button palette and/or skin associated with the configuration may be displayed by the universal remote control device. Each time a different target device is selected, the button palette and/or skin displayed on the universal remote control device may change accordingly.

This may allow the button palette for each target device to be specific to the target device. For example, buttons relevant to the selected target device may be displayed and buttons irrelevant to the selected target device may be hidden. This may simplify the display of the universal remote control device by limiting the buttons included in the button palette, which may promote an intuitive, simplified user experience. In addition, a manufacturer of a target device may provide a button palette specific to the target device for use display by a universal remote control device configured to remotely control the target device.

A universal remote control device may still be programmable for target devices not associated with custom displays. To this end, the universal remote control device may be initially configured with one or more default button palettes, which the universal remote control device may be configured to display for use by a user in providing input to control certain types of target devices. A default button palette may be programmed into the universal remote control device such that the universal remote control device may associate one or more configurations to the default button palette. For example, the universal remote control device may be configured to display a default "television" button palette when a configuration for a target television device is activated and the configuration does not specify a custom button palette to be displayed by the universal remote control device. Similarly, the universal remote control device may be configured to display a default "DVD" button palette when a configuration for a target DVD device is activated and the configuration does not specify a custom button palette to be displayed by the universal remote control device.

Figure 5A:
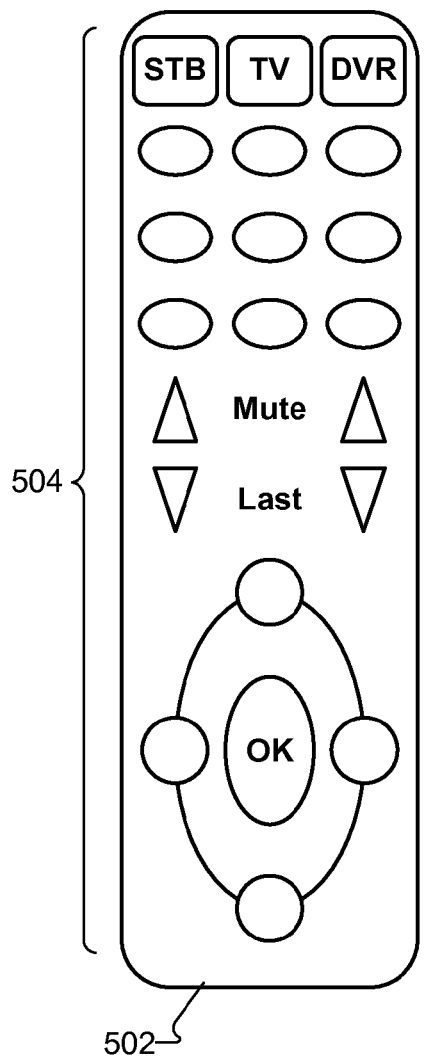
Figure 5B:
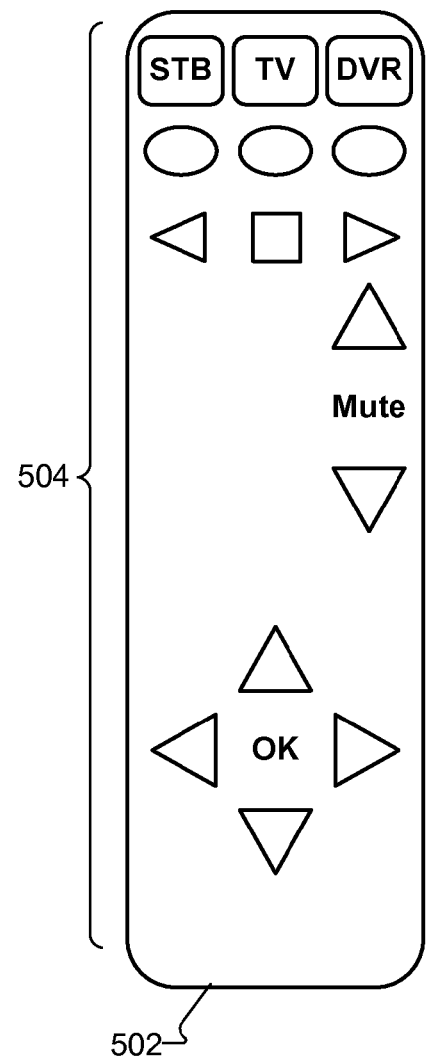

To illustrate, FIGS. 5A-5B show exemplary default button palettes displayed on a universal remote control device 502. In FIG. 5A, default button palette 504 includes a physical layout of buttons that may be actuated by a user to remotely control a television device when the configuration associated with the television device is active. Button palette 504 may be displayed by the universal remote control device when a configuration associated with any "television" type target device is active. In FIG. 5B, default button palette 506 includes a physical layout of buttons that may be actuated by a user of universal remote control device 502 to remotely control a DVR device when the configuration associated with the DVR device is active. Button palette 506 may be displayed by the universal remote control device when any configuration associated with a "DVR" type target device is active.

When a universal remote control device is programmed with a configuration for controlling a particular target device, the universal remote control device may be programmed to display either a default button palette or a custom button palette when the configuration is active. For example, if the configuration does not include a custom button palette, the universal remote control device may automatically associate the configuration with a default button palette. The association may be made in any suitable way. For example, the universal remote control device may be configured to determine, from the configuration, the type of target device (e.g., a DVR type device) to be controlled by the configuration. The universal remote control device may then associate the configuration with a corresponding default button palette (e.g., a default button palette associated with a DVR type device).

Figure 6:
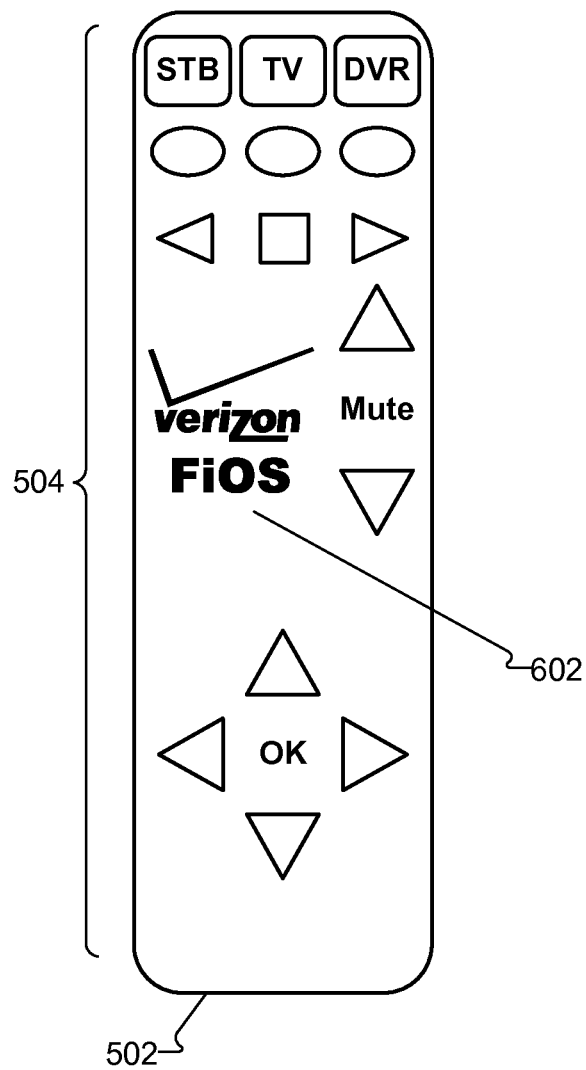

On the other hand, if the configuration includes a custom button palette, the universal remote control device may override the use of a default button palette such that the custom button palette may be displayed instead of the default button palette when the configuration is active. Alternatively, in some examples, the universal remote control device may be configured to leverage a default button palette, such as by modifying the default button palette (e.g., by hiding part of or adding to the default button palette) to create a custom button palette. For example, a new button may be added to the default button palette to create a custom button palette. As another example, a skin may be added to customize the look of a default button palette. FIG. 6 illustrates an exemplary custom skin 602 displayed together with default button palette 504 on universal remote control device 502.

The configurable display of a universal remote control device may be leveraged to provide flexibility in programming the universal remote control device to selectively control multiple different target devices. For example, the configurable display may be configured to display a configurable device selector button palette containing one or more device selector buttons each of which may be actuated by a user to activate a configuration for controlling a particular target device. Because the device selector button palette is configurable, device selector buttons within the palette may be removed, added, rearranged, repositioned, or otherwise configured as may suit the configurations programmed into the universal remote control device.

Figure 7:
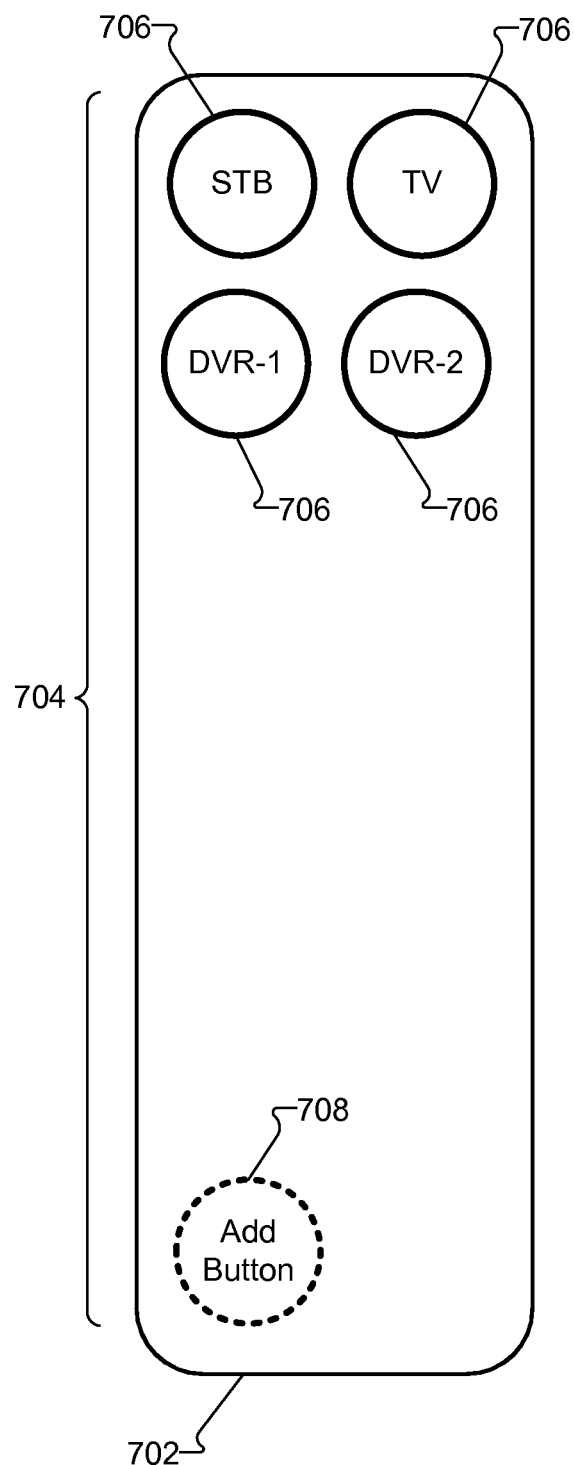

FIG. 7 illustrates a universal remote control device 702 displaying an exemplary device selector palette 704. As shown, device selector palette 704 may include a plurality of device selector buttons 706, each of which may visually indicate a corresponding target device to which the button is associated. As also shown, device selector palette 704 may include room to add a plethora of other buttons for other target devices. A button 708 labeled "add button" may be selected to add a new button to device selector buttons 706. Alternatively, a new button may be automatically added when universal remote control device 702 is configured with a configuration for controlling a new target device. Buttons within device selector palette 704 may additionally or alternatively be removed and/or repositioned. Such a flexible palette of device selector buttons provides significant flexibility in programming the universal remote control device.

In certain implementations, a universal remote control device may include a single physical button configured to trigger a launch of a display of a device selector palette such as device selector palette 704 on a configurable display of the universal remote control device. Accordingly, during operation of the universal remote control device in control mode, a user may actuate the physical button to trigger a launch and display of device selector palette 704 from which the user may select a button to indicate a target device to be controlled. The universal remote control device may respond by activating the configuration associated with the target device such that target device is configured to control the target device. In certain examples, the universal remote control device may further respond by closing device selector palette 704 and launching and displaying a button palette associated with the configuration.

During operation of the universal remote control device in learning mode, a user may actuate the single physical button to trigger a launch and display of device selector palette 704 within which the user may select to modify device selector palette 704, such as by adding a new button for a new target device. The universal remote control device may add the new button, receive a device code via an inter-device communication, and automatically program the universal remote control device with a configuration for controlling the new target device associated with the device code, as described herein. The programming may include associating the configuration with the new button such that the user may select the new button to activate the configuration when the universal remote control device is operating in control mode, as described above.

In certain embodiments, a target device may be configured to provide, and a universal remote control device may be configured to receive and process programming data representative of information related to media content associated with the target device. For example, the target device may provide metadata associated with a media content program, program guide information, information about a presentation or recording of a media content program, sponsorship information, and any other information related to media content. To illustrate, a target device may present a sports program sponsored by a sports drink company. During the presentation, the target device may transmit information about the sponsor of the program. The universal remote control device may be configured to receive and process the information about the sponsor of the program. For instance, the universal remote control device may automatically display information about the sponsor (e.g., the company's logo, an advertisement, etc.) on a configurable display of the universal remote control device. In this or a similar manner, the universal remote control device may be configured to dynamically display text and/or graphics related to media content associated with a target device (e.g., media content being presented by the target device) on the display of the universal remote control device, including as part of a skin displayed by the universal remote control device. In this or a similar manner, the skin shown on a configurable display of the universal remote control device may dynamically morph based on information about media content being presented by a target device.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 8:
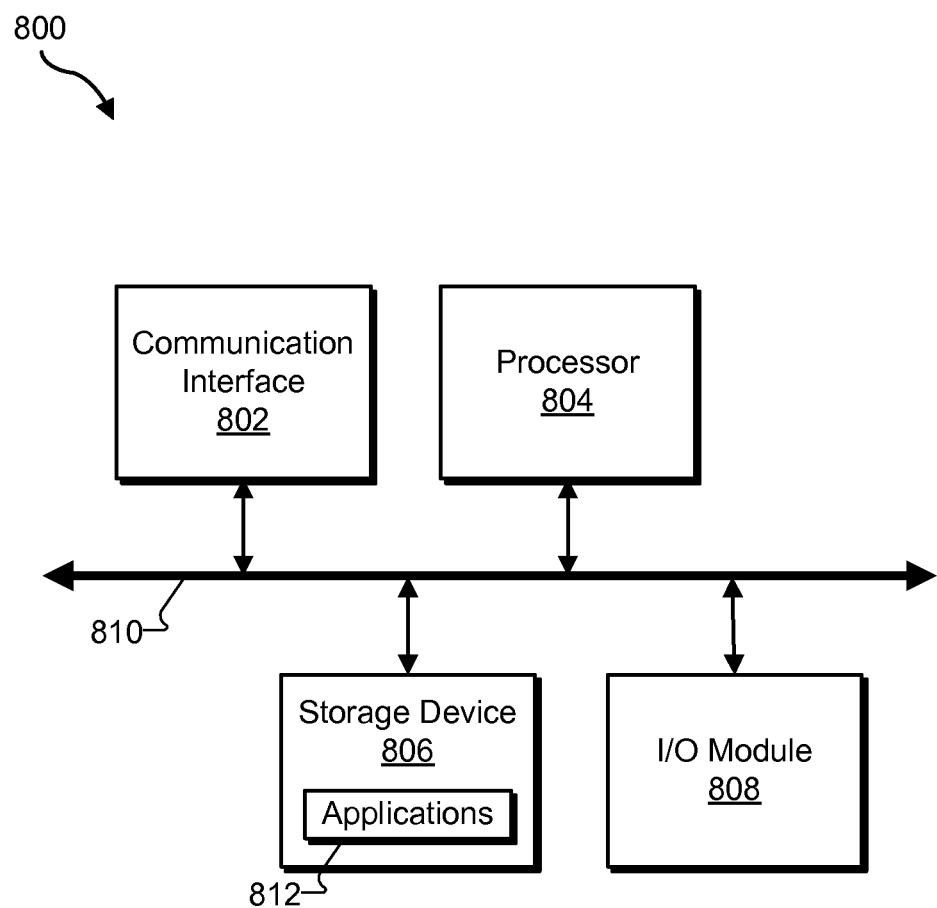

FIG. 8 illustrates an exemplary computing device 800 that may be configured to perform one or more of the processes described herein. As shown in FIG. 8, computing device 800 may include a communication interface 802, a processor 804, a storage device 806, and an input/output ("I/O") module 808 communicatively connected via a communication infrastructure 810. While an exemplary computing device 800 is shown in FIG. 8, the components illustrated in FIG. 8 are not intended to be limiting. Additional or alternative components may be used in other embodiments. Components of computing device 800 shown in FIG. 8 will now be described in additional detail.

Communication interface 802 may be configured to communicate with one or more computing and/or electronic devices. Examples of communication interface 802 include, without limitation, a wired network interface (such as a network interface card), a wireless network interface (such as a wireless network interface card), a modem, an audio/video connection, an infrared receiver, transmitter, or transceiver, and any other suitable interface.

Processor 804 generally represents any type or form of processing unit capable of processing data or interpreting, executing, and/or directing execution of one or more of the instructions, processes, and/or operations described herein. Processor 804 may direct execution of operations in accordance with one or more applications 812 or other computer-executable instructions such as may be stored in storage device 806 or another computer-readable medium.

Storage device 806 may include one or more data storage media, devices, or configurations and may employ any type, form, and combination of data storage media and/or device. For example, storage device 806 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 806. For example, data representative of one or more executable applications 812 (which may include, but are not limited to, one or more of the software applications described herein) configured to direct processor 804 to perform any of the operations described herein may be stored within storage device 806. In some examples, data may be arranged in one or more databases residing within storage device 806.

I/O module 808 may be configured to receive user input and provide user output and may include any hardware, firmware, software, or combination thereof supportive of input and output capabilities. For example, I/O module 808 may include hardware and/or software for capturing user input, including, but not limited to, a keyboard or keypad, a touch screen component (e.g., touch screen display), a receiver (e.g., an RF or infrared receiver), and/or one or more input buttons.

I/O module 808 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 808 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 800. For example, one or more applications 812 residing within storage device 806 may be configured to direct processor 804 to perform one or more processes or functions associated with user interface facility 102, device interface facility 104, configuration facility 106, operation facility 108, universal remote control device 202, 502, or 702. Likewise, storage facility 110 may be implemented by or within storage device 806.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    detecting, by a universal remote control device, user input requesting that the universal remote control device be operated in a learning mode;
    initiating, by the universal remote control device in response to the user input, operation of the universal remote control device in the learning mode;
    receiving, by the universal remote control device during the operation of the universal remote control device in the learning mode, a device code via an inter-device communication;
    automatically programming, by the universal remote control device in response to the receiving of the device code via the inter-device communication, the universal remote control device for remotely controlling a target device associated with the device code;
    receiving, by the universal remote control device and from the target device, information about media content being presented by the target device; and
    detecting, by the universal remote control device, a user selection of a device selector button while the universal remote control device is operating in a control mode.

2. The method of claim 1, wherein the receiving of the device code comprises receiving the device code from the target device via the inter-device communication.

3. The method of claim 2, wherein the receiving of the device code comprises receiving the device code directly from the target device via the inter-device communication.

4. The method of claim 3, wherein the inter-device communication comprises an infrared communication.

5. The method of claim 3, wherein the inter-device communication comprises a wireless communication.

6. The method of claim 2, wherein the receiving of the device code comprises receiving the device code indirectly from the target device by way of a network.

7. The method of claim 2, further comprising the target device transmitting the inter-device communication carrying the device code to the universal remote control device.

8. The method of claim 7, wherein the target device transmits the inter-device communication carrying the device code to the universal remote control device in response to user input detected by the target device.

9. The method of claim 7, wherein the target device transmits the inter-device communication carrying the device code to the universal remote control device in response to a powering on of the target device.

10. The method of claim 1, wherein the automatically programming comprises programming the universal remote control device with a configuration for remotely controlling the target electronic device associated with the device code.

11. The method of claim 10, wherein the automatically programming comprises accessing, by the universal remote control device in response to the receiving of the device code via the inter-device communication, configuration data for the configuration from at least one of a data store internal to the universal remote control device, a server device, and the target device.

12. The method of claim 10, wherein:
    the receiving of the device code comprises receiving the device code from the target device via the inter-device communication; and
    the automatically programming comprises receiving configuration data for the configuration together with the device code from the target device.

13. The method of claim 10, wherein the configuration includes data representative of a button palette specific to the target device for display by the universal remote control device.

14. The method of claim 13, wherein the automatically programming comprises associating the configuration of the universal remote control device for remotely controlling the target device to the device selector button of the universal remote control device, the method further comprising:
automatically displaying, by the universal remote control device in response to the detecting of the user selection of the device selector button, the button palette specific to the device code.

15. The method of claim 14, further comprising:
detecting, by the universal remote control device, a user selection of an additional device selector button while the universal remote control device is operating in the control mode, the additional device selector button associated with an additional configuration for remotely controlling an additional target device;
activating, by the universal remote control device, the additional configuration in response to the user selection of the additional device selector button; and
replacing, by the universal remote control device, the display of the button palette with a display of an additional button palette associated with the additional configuration.

16. The method of claim 15, wherein:
the first button palette consists of a set of buttons relevant to remotely controlling the target device; and
the second button palette consists of a different set of buttons relevant to remotely controlling the additional target device.

17. The method of claim 10, wherein the configuration includes graphics data representative of a skin specific to the target device for display by the universal remote control device.

18. The method of claim 1, further comprising:
dynamically morphing, by the universal remote control device, a skin displayed on a configurable display of the universal remote control device based on the information about the media content being presented by the target device.

19. The method of claim 1, embodied as computer-executable instructions on at least one non-transitory computer-readable medium.

20. The method of claim 1, wherein:
the media content information sent to the universal remote control device includes advertising information associated with the media content being presented by the target device; and
the universal remote control device is configured to dynamically display on the universal remote control device at least one of text and graphics related to the advertising information.

21. A system comprising:
a user interface facility configured to detect user input requesting that a universal remote control device be operated in a learning mode;
a configuration facility communicatively coupled to the user interface facility and configured to initiate, in response to the user input, operation of the universal remote control device in the learning mode; and
a device interface communicatively coupled to the configuration facility and configured to receive, during the operation of the universal remote control device in the learning mode, a device code via an inter-device communication;
wherein the configuration facility is further configured to automatically program, in response to the receipt of the device code via the inter-device communication, the universal remote control device for remotely controlling a target device associated with the device code;
wherein the device interface is further configured to receive, from the target device, information about media content being presented by the target device and provide the information to the universal remote control device; and
wherein the user interface facility is further configured to detect a user selection of a device selector button while the universal remote control device is operating in a control mode.

22. A system comprising:
a target customer premises equipment ("CPE") device configured to transmit a device code associated with the target CPE device in response to receipt of a predefined user input; and
a universal remote control device configured to
receive, during operation of the universal remote control device in a learning mode, the device code transmitted by the target CPE device,
automatically program, in response to the receipt of the device code, the universal remote control device with a configuration for remotely controlling the target device,
receive, from the target CPE device, information about media content being presented by the target device, and
detect, while the universal remote control device is operating in a control mode, a user selection of a device selector button.

23. The system of claim 22, wherein:
the universal remote control device comprises a configurable display; and
the configuration includes data representative of at least one of a custom button palette and a custom skin specific to the target device for display on the configurable display.

24. The system of claim 23, wherein the configurable display employs a bi-stable e-paper technology.

* * * * *